US012665289B2

(12) United States Patent
Hong

(10) Patent No.: US 12,665,289 B2
(45) Date of Patent: Jun. 23, 2026

(54) ANTENNA MODULE FOR SMALL DEVICE WITH A GROUND EXPANSION MEMBER

(71) Applicant: AMOSENSE CO., LTD., Cheonan-si (KR)

(72) Inventor: Jaeho Hong, Seoul (KR)

(73) Assignee: AMOSENSE CO., LTD., Cheonan-si (KR)

( * ) Notice: Subject to any disclaimer, the term of this patent is extended or adjusted under 35 U.S.C. 154(b) by 167 days.

(21) Appl. No.: 17/771,430

(22) PCT Filed: Oct. 21, 2020

(86) PCT No.: PCT/KR2020/014409
§ 371 (c)(1),
(2) Date: Apr. 22, 2022

(87) PCT Pub. No.: WO2021/080317
PCT Pub. Date: Apr. 29, 2021

(65) Prior Publication Data
US 2022/0376382 A1 Nov. 24, 2022

(30) Foreign Application Priority Data
Oct. 22, 2019 (KR) ........................ 10-2019-0131595

(51) Int. Cl.
*H01Q 1/27* (2006.01)
*H01Q 1/48* (2006.01)

(52) U.S. Cl.
CPC ............... *H01Q 1/273* (2013.01); *H01Q 1/48* (2013.01)

(58) Field of Classification Search
CPC ............. H01Q 1/273; H01Q 1/48; H01Q 7/00
See application file for complete search history.

(56) References Cited

U.S. PATENT DOCUMENTS 10,014,582 B2 7/2018 Ryu et al.
2008/0316115 A1* 12/2008 Hill ........................ H01Q 21/30 343/702
2010/0302110 A1* 12/2010 Leem ..................... H01Q 1/521 343/893
(Continued)

FOREIGN PATENT DOCUMENTS

JP 2002246935 A * 8/2002 ............. H01Q 1/243
KR 10-2010-0071410 A 6/2010
(Continued)

OTHER PUBLICATIONS

Korean Office Action from corresponding KR Application No. 10-2020-0136755, Jan. 24, 2022.

*Primary Examiner* — Dameon E Levi
*Assistant Examiner* — Yonchan J Kim
(74) *Attorney, Agent, or Firm* — Maschoff Brennan

(57) ABSTRACT

Proposed is an antenna module for a small device, wherein the antenna module is expanded to a ground area through a metal plate, a metal wire, or a connector FPCB and the like to improve antenna gain. The proposed antenna module for a small device is provided with an antenna, and comprises: a circuit board mounted inside a housing of a small device; and a ground expansion member which is mounted inside the housing, comprises one of the metal plate, the metal wire, or the connector FPCB, and has a first end connected to a ground line of the antenna.

1 Claim, 10 Drawing Sheets

(56) References Cited

U.S. PATENT DOCUMENTS

| | | | | | |
|---|---|---|---|---|---|
| 2011/0012796 | A1* | 1/2011 | Kim | G04R 60/12<br>343/702 |
| 2014/0078008 | A1* | 3/2014 | Kang | H01Q 5/35<br>343/702 |
| 2015/0364813 | A1* | 12/2015 | Darnell | H01Q 1/48<br>343/702 |

FOREIGN PATENT DOCUMENTS

| | | | | | |
|---|---|---|---|---|---|
| KR | 2011131750 | A | * | 12/2011 | |
| KR | 20110131750 | A | * | 12/2011 | |
| KR | 10-2011-0131750 | A | | 5/2015 | |
| KR | 10-1622606 | B1 | | 5/2016 | |
| KR | 101165919 | B1 | | 5/2016 | |
| KR | 10-2016-0135440 | A | | 11/2016 | |
| KR | 10-2018-0006671 | A | | 1/2018 | |
| KR | 20180006671 | A | * | 1/2018 | H01Q 1/38 |
| WO | 2014142411 | A1 | | 9/2014 | |

* cited by examiner

[FIG. 1]
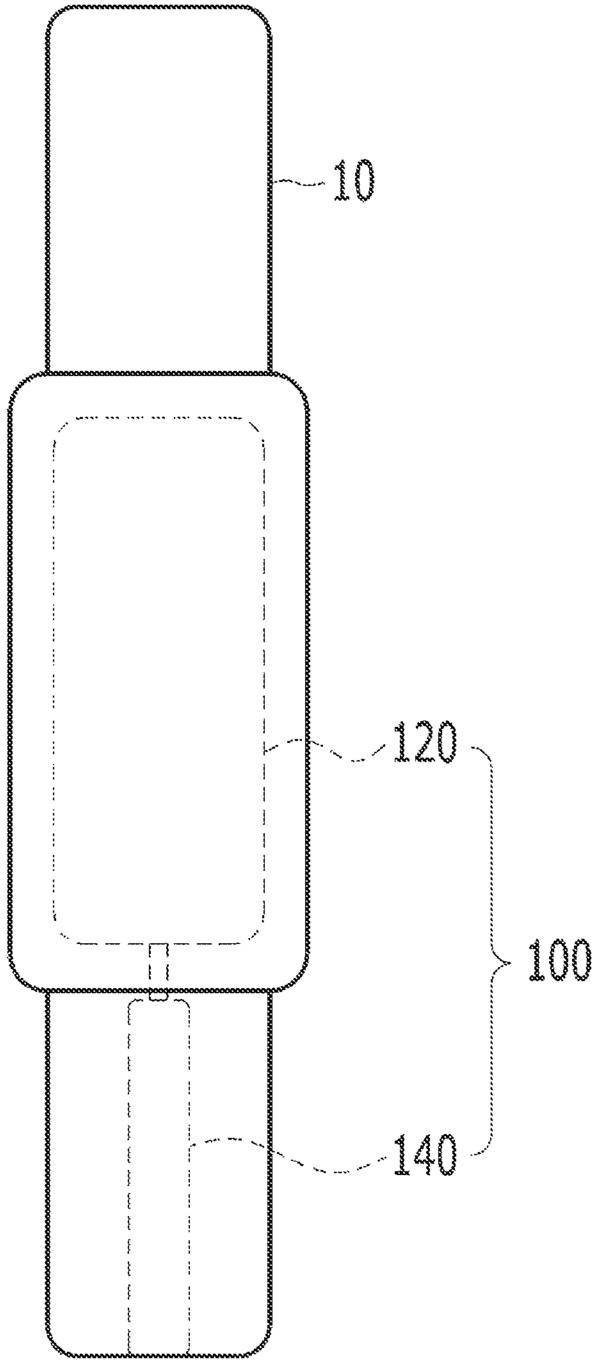

[FIG. 2]
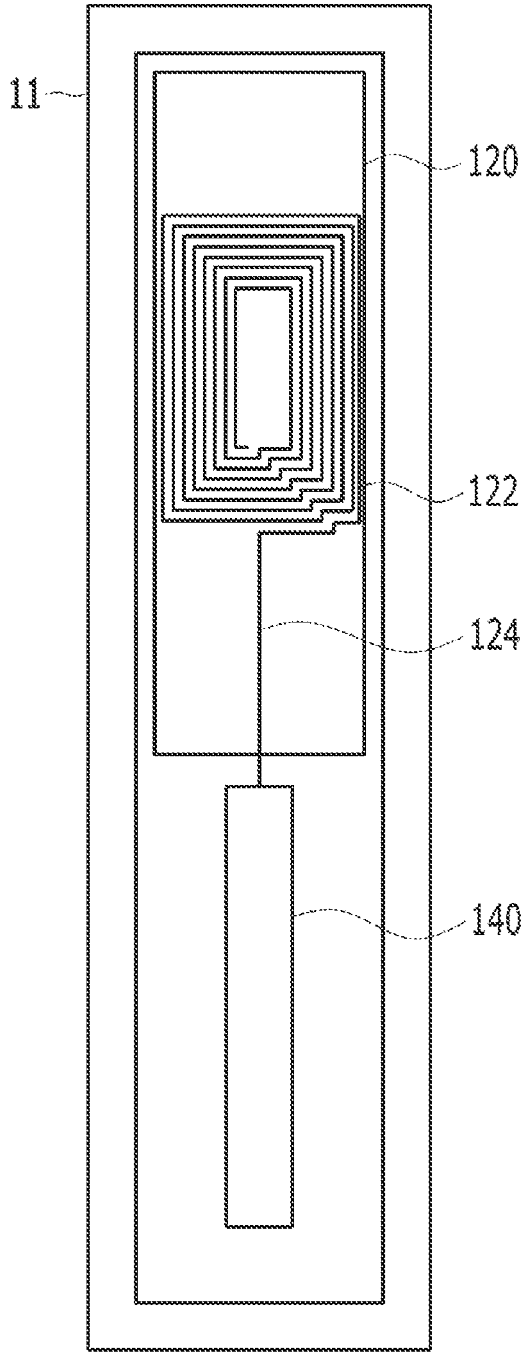

[FIG. 3]
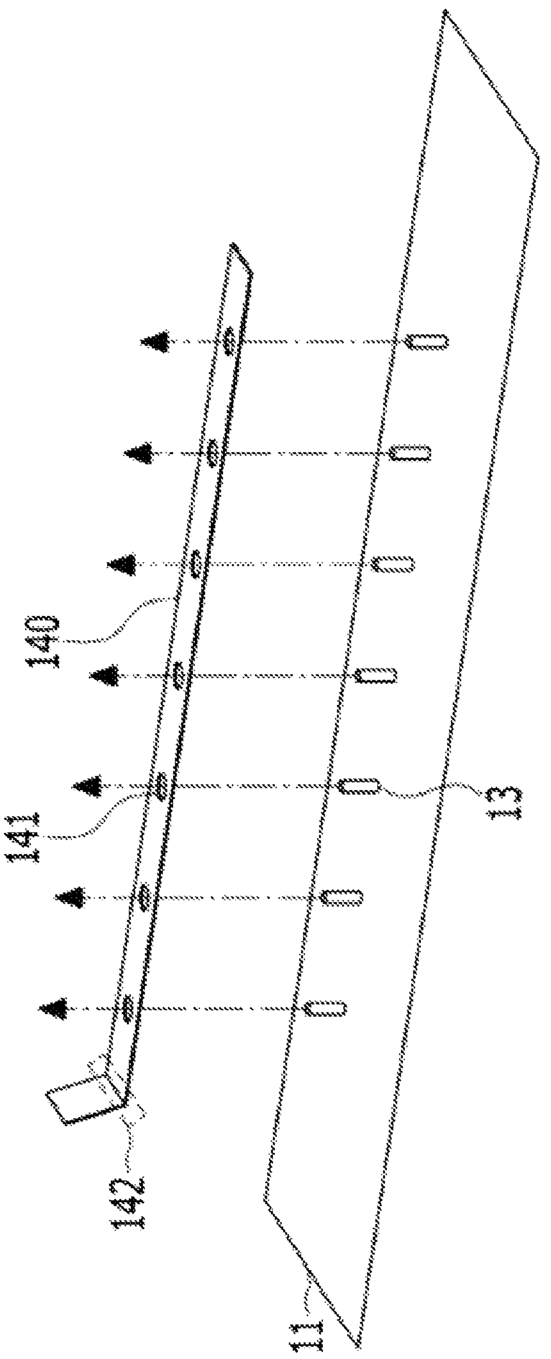

[FIG. 4]
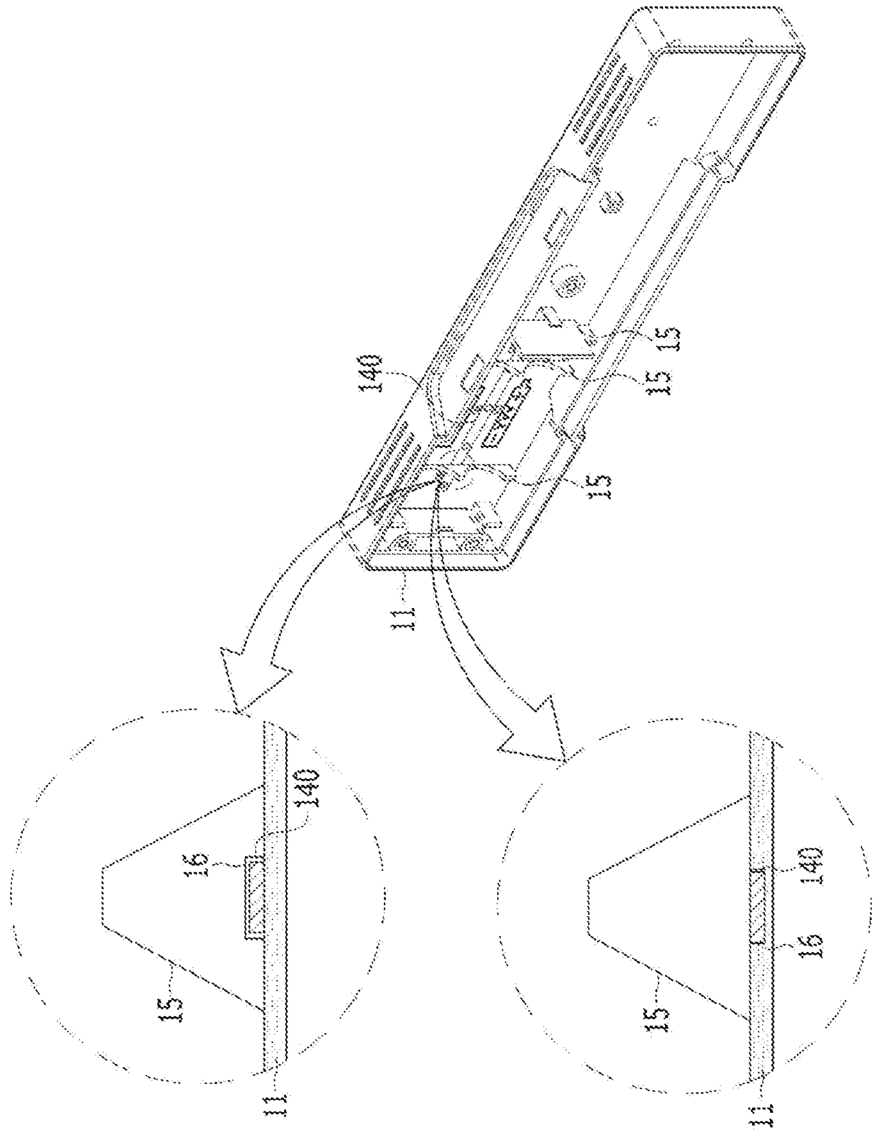

[FIG. 5]
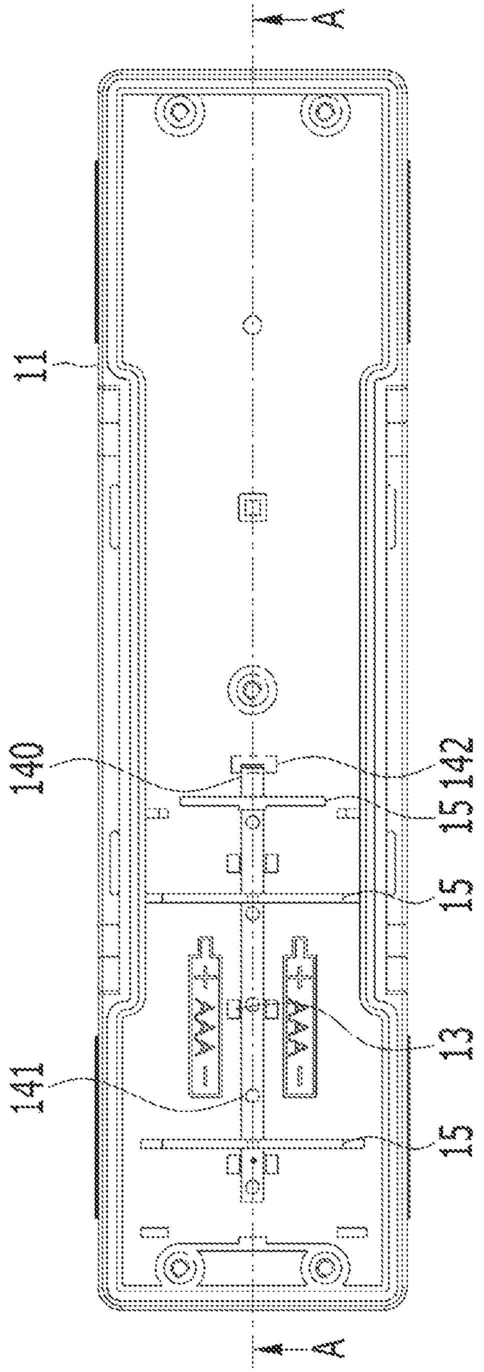

[FIG. 6]
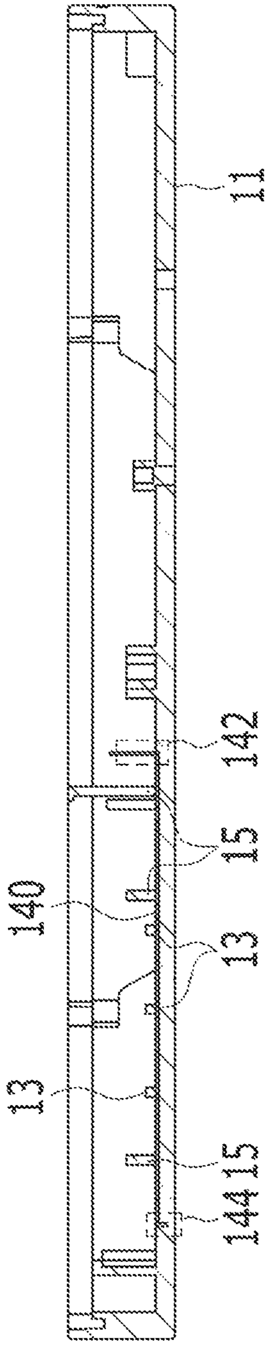

[FIG. 7]
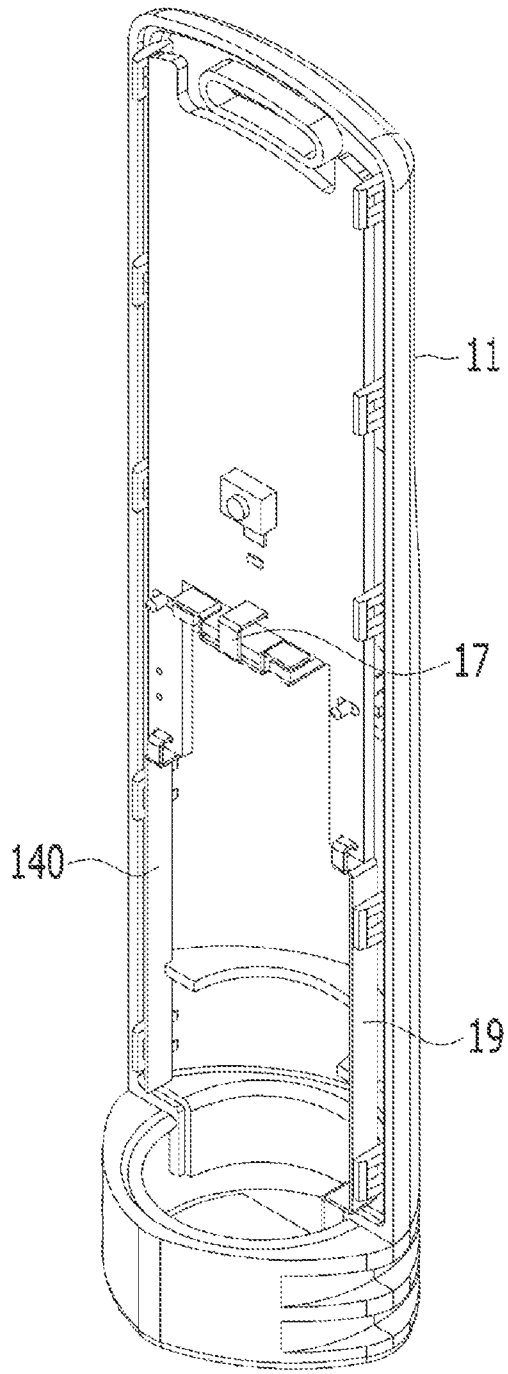

[FIG. 8]
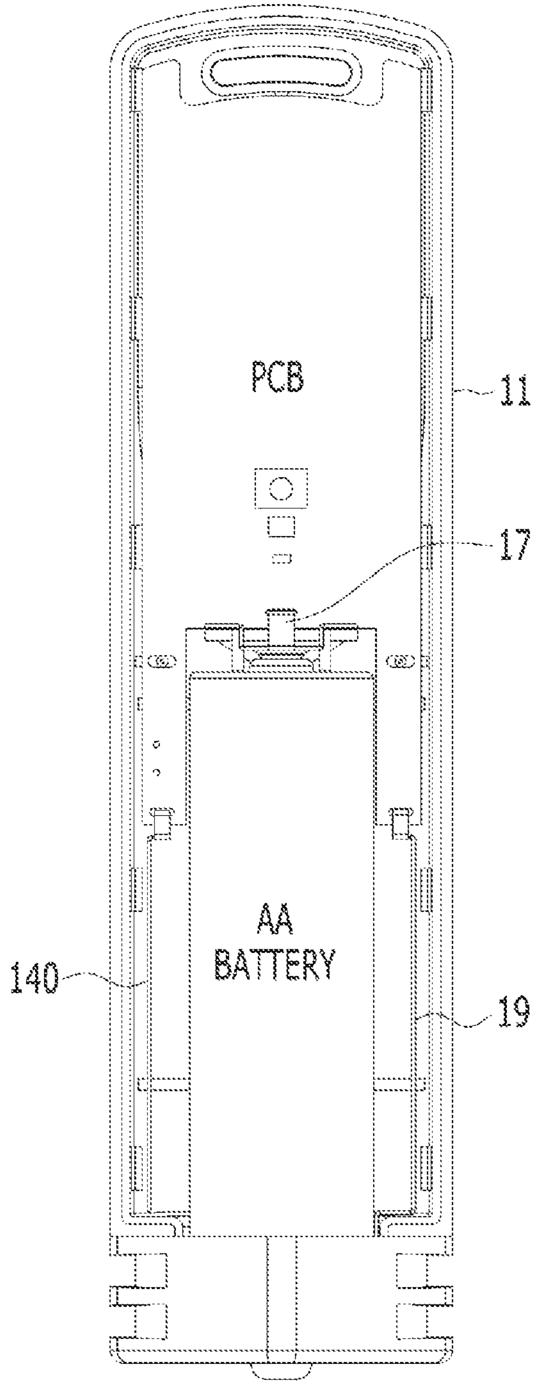

[FIG. 9]
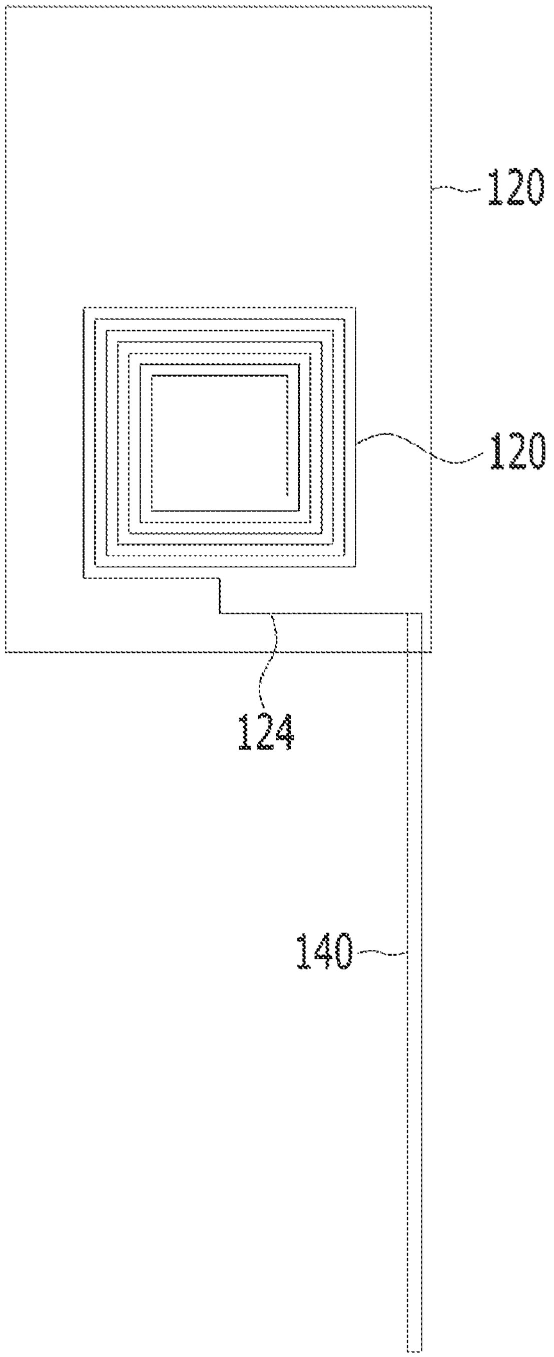

[FIG. 10]
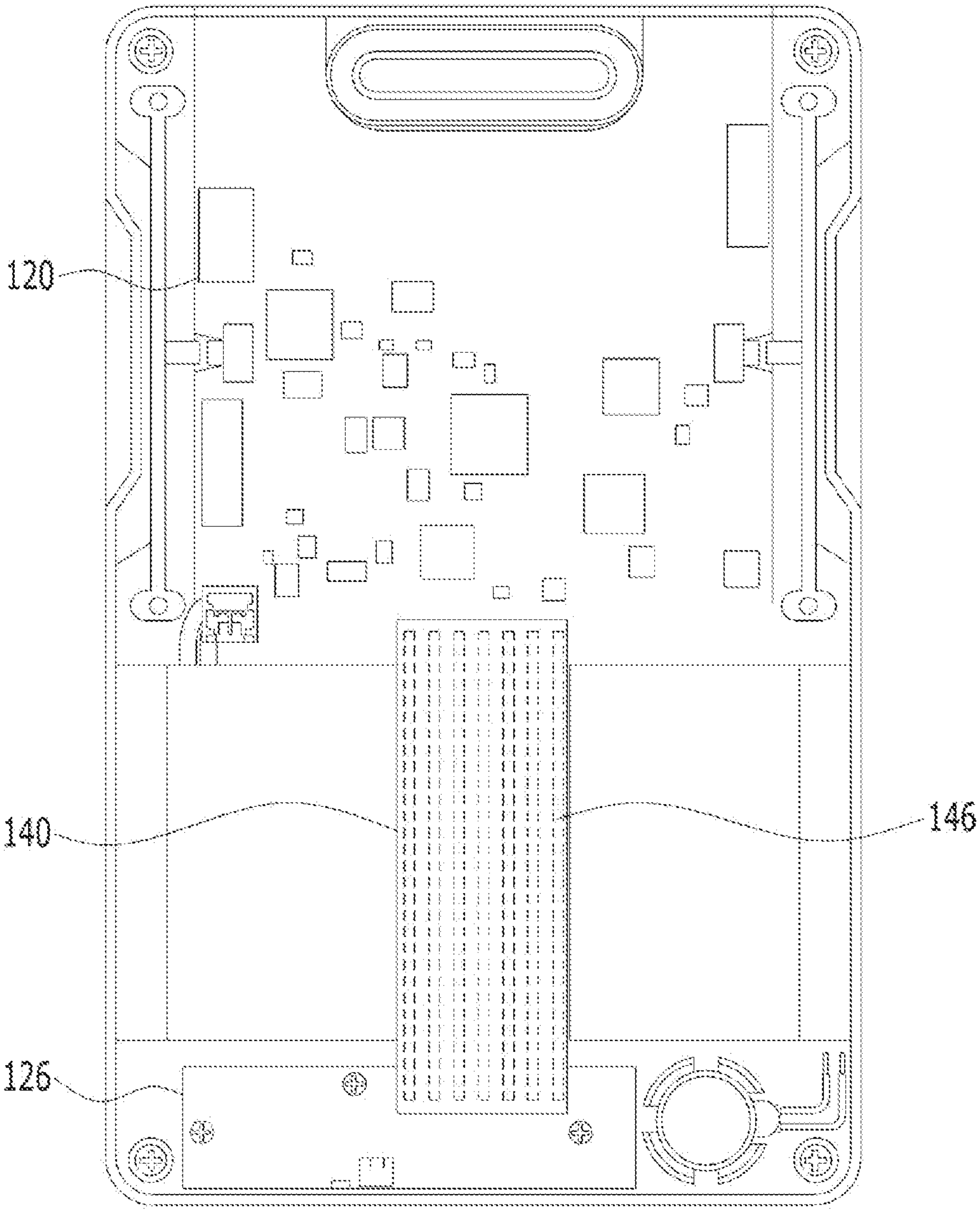

ANTENNA MODULE FOR SMALL DEVICE WITH A GROUND EXPANSION MEMBER

TECHNICAL FIELD

The present disclosure relates to an antenna module for a small device, and more specifically, to an antenna module for a small device mounted on a small electronic device such as a smart watch or a smart band.

BACKGROUND ART

Recently, the use of small electronic devices (wearable devices) such as smart watches and smart bands is increasing. Antennas for supporting various communications are mounted on small electronic devices. However, the small electronic devices have a problem in that the antenna performance is very poor compared to the general electronic devices because the size of the circuit board therein is small.

SUMMARY OF INVENTION

Technical Problem

The present disclosure has been proposed to solve the above problem, and an object of the present disclosure is to provide an antenna module for a small device, which is expanded to a ground area through a metal plate, a metal wire, a connector FPCB (Flexible Printed Circuit Board), etc. to improve antenna gain.

Solution to Problem

In order to achieve the object, an antenna module for a small device according to an embodiment of the present disclosure includes a circuit board provided with an antenna and mounted inside a housing of a small device and a ground expansion member mounted inside the housing and having a first end connected to a ground line of the antenna.

The ground expansion member can be a metal plate mounted on an inner wall of the housing. The housing can have a support protrusion formed on the inner wall, and the ground expansion member can be formed with a support hole through which the support protrusion penetrates. The first end of the ground expansion member can be bent in a first direction to form a first bending part. A second end of the ground expansion member can be bent in a second direction opposite to the first direction to form a second bending part, and the second bending part can be inserted into and fixed to a groove of the housing.

The housing can have a reinforcing wall formed on the inner wall, the reinforcing wall can have an insertion hole formed in a region connected to the housing, and the ground expansion member can be inserted into the insertion hole.

The housing can have a reinforcing wall formed on the inner wall, the housing can have an insertion hole formed in a region connected to the reinforcing wall, and the ground expansion member can be inserted into the insertion hole.

The ground expansion member can be formed of a metal wire having an insulating cover formed outside, and a first end of the metal wire can be connected to the ground line of the antenna.

The antenna module for a small device according to the embodiment of the present disclosure can further include an auxiliary circuit board mounted in the housing of the small device and spaced apart from the circuit board, and a flexible printed circuit board for connector provided with a plurality of conductor patterns and connecting the circuit board and the auxiliary circuit board through some of the plurality of conductor patterns, in which the plurality of conductor patterns can include a connector pattern connecting the circuit board and the auxiliary circuit board and a ground pattern connected to the ground line of the antenna, and the ground expansion member can be the ground pattern.

Advantageous Effects of Invention

According to the present disclosure, the antenna module for a small device can be expanded to the ground area through the metal plate, the metal wire, the connector FPCB, etc. to secure the gain of the antenna of the reference value or more even in the small device having the limited accommodation space.

In particular, the antenna module for the small device can use the antenna having the communication frequency of 1 GHz or less to secure the gain the antenna of the reference value or more.

BRIEF DESCRIPTION OF DRAWINGS

FIG. 1 is a diagram for describing an antenna module for a small device according to one embodiment of the present disclosure.

FIG. 2 is a diagram for describing a configuration of the antenna module for a small device according to one embodiment of the present disclosure.

FIG. 3 is a diagram for describing an example in which a ground expansion member shown in FIG. 2 is fitted into and coupled to a housing of a small device.

FIG. 4 is a diagram for describing an example in which the ground expansion member shown in FIG. 2 is inserted into and coupled to the housing of a small device.

FIGS. 5 and 6 are diagrams for describing another example in which the ground expansion member shown in FIG. 2 is coupled to the housing of a small device.

FIGS. 7 and 8 are diagrams for describing an example of a placement structure of the ground expansion member shown in FIG. 2.

FIG. 9 is a diagram for describing an example in which the ground expansion member shown in FIG. 2 is formed of a wire.

FIG. 10 is a diagram for describing an example in which the ground expansion member shown in FIG. 2 is formed of a flexible printed circuit board for connector.

DESCRIPTION OF EMBODIMENTS

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function may obscure the gist of the present disclosure, the detailed description thereof will be omitted.

Referring to FIG. 1, an antenna module for a small device according to an embodiment of the present disclosure is an antenna module 100 mounted on a small device 10 (e.g., a wearable device) (the antenna module 100 is also referred to in the present disclosure as "the antenna module for a small device") such as a smart watch or a smart band. At this time, the antenna module for a small device is, for example, an antenna having a communication frequency of about 1 GHz or less.

The antenna module for a small device is provided with a separate ground expansion member 140 in addition to a circuit board 120 mounted inside a housing 11 of the small device 10 to maximize a ground area, thereby maximizing the gain of a certain value or more even in the small device 10.

The ground expansion member 140 is mainly formed of a metal (conductor), and is composed of a metal plate, a metal wire, a metal pattern, etc.

Referring to FIG. 2, the antenna module for a small device is configured to include the circuit board 120 and the ground expansion member 140.

The circuit board 120 is mounted inside the housing 11 of the small device 10. The circuit board 120 can be a main board embedded in a small device. The circuit board 120 is formed with circuits (or elements) for processing and controlling various signals.

The circuit board 120 includes an antenna 122. Here, the antenna 122 can be a radiation pattern formed on the circuit board 120 or a flexible printed circuit board separated from the circuit board 120. The antenna 122 can be configured as a loop antenna due to a space constraint of a small device.

The antenna 122 can be formed directly on a first surface and/or a second surface of the circuit board 120. At this time, the antenna 122 is formed by printing a metal pattern of a predetermined shape on the first surface and/or second surface of the circuit board 120 through a printing process. Here, it is assumed that the first surface is an upper surface of the circuit board 120, and the second surface is a lower surface of the circuit board 120 as an example.

The antenna 122 can also be configured as a printed circuit board independent of the circuit board 120. The antenna 122 is formed by printing a metal pattern of a predetermined shape on the first surface and/or second surface of the flexible base material. The antenna 122 is mounted on the first surface or the second surface of the circuit board 120. At this time, the antenna 122 is connected to a signal processing circuit (or signal processing element) in the circuit board through a connector formed on the circuit board 120. Here, it is assumed that the first surface of the flexible base material is an upper surface of the flexible base material, and the second surface of the flexible base material is a lower surface of the flexible base material as an example.

The ground expansion member 140 can be configured as a metal plate. The ground expansion member 140 is disposed inside the housing 11 of the small device 10. The ground expansion member 140 is mounted on an inner wall surface of the housing 11.

As an example, referring to FIG. 3, the ground expansion member 140 is fitted into and coupled to the housing 11 of the small device 10.

A plurality of support protrusions 13 for mounting and fixing the ground expansion member 140 are formed in the housing 11 of the small device 10.

A plurality of support holes 141 into which a plurality of support protrusions 13 are inserted are formed in the ground expansion member 140. As the plurality of support protrusions 13 are inserted into the plurality of support holes 141, respectively, the ground expansion member 140 is fitted into and coupled to the inner wall surface of the housing 11 of the small device 10.

At this time, as the end of the support protrusion 13 is heated and pressurized after the ground expansion member 140 is mounted, a support plate is formed on the end of the support protrusion 13. The support plate is formed to have a greater area than that of the support hole 141 to prevent the ground expansion member 140 from being separated from the housing 11 of the small device 10.

The ground expansion member 140 is electrically connected to the antenna 122 in a state of being mounted on the inner wall surface of the housing 11 of the small device 10. At this time, the ground expansion member 140 is electrically connected to a ground line 124 of the antenna 122. In order to facilitate the connection with the antenna 122, the ground expansion member 140 can have a first bent part 142 in which a first end adjacent to the antenna 122 is bent in an inner direction of the housing 11.

As another example, referring to FIG. 4, the ground expansion member 140 can be inserted into and coupled to the housing 11 of the small device 10.

The housing 11 has a plurality of reinforcing walls 15 formed therein in order to reinforce the strength or guide an insertion location of a battery. The housing 11 is formed with an insertion hole 16 into which the ground expansion member 140 is inserted on a portion where the reinforcing wall 15 and the inner wall surface of the housing 11 are in contact with each other.

Here, the insertion hole 16 can be formed by cutting off a part of the inner surface of the housing 11 in a region where the housing 11 and the reinforcing wall 15 are connected, or formed by cutting off a part of the reinforcing wall 15.

The ground expansion member 140 is sequentially inserted into the insertion holes 16 formed in the plurality of reinforcing walls 15 and inserted into and coupled to the housing 11.

The ground expansion member 140 is electrically connected to the antenna 122 in a state of being mounted on the inner wall surface of the housing 11. The ground expansion member 140 is electrically connected to the ground line 124 of the antenna 122.

Referring to FIGS. 5 and 6, the ground expansion member 140 can also be coupled to the housing 11 of the small device 10 through a fitting and coupling structure and an inserting and coupling structure. In other words, the ground expansion member 140 and the housing 11 are firmly coupled by fitting and coupling the support protrusion 13 of the housing 11 into and to the support hole 141 of the ground expansion member 140 at the same time as inserting and coupling the ground expansion member 140.

Meanwhile, the ground expansion member 140 can have a second bending part 144 formed on a second end opposite to a first end on which the first bending part 142 is formed in order to be firmly coupled to the housing 11. At this time, the second end of the ground expansion member 140 is bent on the second bending part 144 and inserted into and fixed to a groove of the housing 11.

Referring to FIGS. 7 and 8, the ground expansion member 140 can be disposed in a region where the battery of the small device 10 is mounted. The ground expansion member 140 is coupled to the housing 11 of the small device 10 through the aforementioned fitting and coupling structure or inserting and coupling structure in the region where the battery is mounted.

The ground expansion member 140 constitutes a ground terminal independent of a (+) terminal 17 and a (−) terminal 19 of the battery mounted on the housing 11 of the small device 10. The ground expansion member 140 is coupled to one side of the circuit board 120 and is configured as an independent terminal not connected to the (+) and (−) of the battery.

At this time, the ground expansion member 140 is formed in a plate shape in which a portion in contact with the (−) of the battery is removed from the (−) terminal 19. The ground expansion member 140 can be formed with the first bending part 142 for facilitating the coupling with the circuit board 120.

The ground expansion member 140 can be formed of a metal wire. The ground expansion member 140 is disposed inside the housing 11 of the small device 10, and the first end of the ground expansion member 140 is electrically connected to the ground line 124 of the antenna 122.

As an example, referring to FIG. 9, the ground expansion member 140 is configured as the ground expansion member 140 connected to the circuit board 120. The ground expansion member 140 can be formed of an electric wire (single wire, stranded wire) having a thickness of a predetermined value or more and having an insulating cover formed therearound. The first end of the ground expansion member 140 is electrically connected to the ground line 124 of the antenna 122 through soldering, a connector, etc.

Referring to FIG. 10, the ground expansion member 140 can be formed of a flexible printed circuit board for a connector connecting the circuit board 120 and an auxiliary circuit board 126. In other words, the ground expansion member 140 is the flexible printed circuit board on which a plurality of conductor patterns 146 (i.e., metal patterns) connecting the main circuit board 120 and the auxiliary circuit board 126 are formed.

The ground expansion member 140 includes the plurality of conductor patterns 146 formed on the flexible printed circuit board, and each conductor pattern 146 is composed of a connector pattern or a ground pattern.

The connector pattern is a conductor pattern 146 electrically connecting the circuit board 120 and the auxiliary circuit board 126. The connector pattern can be composed of one conductor pattern 146 or the plurality of conductor patterns 146.

The ground pattern is the conductor pattern 146 electrically connected to the ground line 124 of the antenna 122. The ground pattern includes one or more conductor patterns 146, and is composed of the remaining conductor patterns 146 other than the conductor pattern 146 composed of the connector pattern among the plurality of conductor patterns 146 included in the flexible printed circuit board for connector. Accordingly, the ground pattern is composed of one or more conductor patterns 146.

Meanwhile, the circuit board 120 further includes a connection pattern (not shown), and the connection pattern (not shown) is formed on the circuit board to electrically connect the ground pattern and the ground line 124 of the antenna.

Accordingly, the ground expansion member 140 can expand the ground area within the limited space without changing the size of the small device 10 to improve the gain of about 2 dB to 4 dB.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An antenna module for a small wearable device comprising: a circuit board provided with an antenna and mounted inside a housing of the small wearable device; an auxiliary circuit board mounted in the housing of the small wearable device and spaced apart from the circuit board, and a flexible printed circuit board for a connector provided with a plurality of conductor patterns and connecting the circuit board and the auxiliary circuit board through some of the plurality of conductor patterns, wherein the some of the plurality of conductor patterns form a connector pattern to connect the circuit board and the auxiliary circuit board and remaining conductor patterns of the plurality of conductor patterns form a ground pattern to connect to a ground line of the antenna, wherein the ground pattern constitutes a ground expansion member having a second end not connected to the ground line to constitute an independent ground terminal to improve a gain from 2 dB to 4 dB; and wherein the housing has a reinforcing wall formed on an inner wall of the housing, the reinforcing wall having an insertion hole formed in a region where the reinforcing wall and the inner wall are in contact, and the flexible printed circuit board is inserted into and fixed to the insertion hole.

* * * * *